(12) United States Patent
Kim

(10) Patent No.: US 8,568,014 B2
(45) Date of Patent: Oct. 29, 2013

(54) BACK-LIGHT UNIT

(75) Inventor: Yong Suk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 13/003,056

(22) PCT Filed: Nov. 18, 2008

(86) PCT No.: PCT/KR2008/006781
§ 371 (c)(1),
(2), (4) Date: Jan. 7, 2011

(87) PCT Pub. No.: WO2010/013869
PCT Pub. Date: Feb. 4, 2010

(65) Prior Publication Data
US 2011/0134629 A1 Jun. 9, 2011

(30) Foreign Application Priority Data
Jul. 29, 2008 (KR) .................. 10-2008-0074003

(51) Int. Cl.
*G09F 13/10* (2006.01)

(52) U.S. Cl.
USPC .................. 362/634; 362/97.4; 362/225

(58) Field of Classification Search
USPC ........ 362/97.4, 223, 225, 246, 306, 382, 631, 362/634
See application file for complete search history.

(56) References Cited

U.S. PATENT DOCUMENTS

| | | | | |
|---|---|---|---|---|
| 4,630,180 A * | 12/1986 | Muraki et al. | ................ | 362/223 |
| 7,156,549 B2 * | 1/2007 | Hsieh | ............... | 362/633 |
| 7,915,605 B2 * | 3/2011 | Tsai et al. | ..................... | 362/612 |
| 7,950,815 B2 * | 5/2011 | Jin et al. | ...................... | 362/97.3 |
| 8,061,863 B2 * | 11/2011 | Min | ............... | 362/97.4 |
| 2002/0044437 A1 | 4/2002 | Lee | ................ | 362/31 |
| 2008/0236193 A1 * | 10/2008 | Chen | ............... | 62/511 |

FOREIGN PATENT DOCUMENTS

| | | |
|---|---|---|
| JP | 2004-206906 A | 7/2004 |
| JP | 2006-024549 A | 1/2006 |
| JP | 2006-208466 A | 8/2006 |
| JP | 2006-308790 A | 11/2006 |
| JP | 2006-330659 A | 12/2006 |

OTHER PUBLICATIONS

European Search Report dated Jan. 25, 2012 issued in Application No. 08 87 6669.
PCT International Search Report dated Jul. 13, 2009 issued in Application No. PCT/KR2008/006781.

* cited by examiner

*Primary Examiner* — Y My Quach Lee
(74) *Attorney, Agent, or Firm* — KED & Associates, LLP

(57) ABSTRACT

A back-light unit is disclosed. An object of the present invention is to provide a back-light unit that is able to improve structural stability and mass-production efficiency. The back-light unit includes a circuit substrate comprising a plurality of light sources arranged thereon, an optical sheet positioned on the circuit substrate, a plurality of supporting parts arranged between the circuit substrate and the optical sheet to support the optical sheet, which are installed to the circuit substrate by using surface-mount technology (SMT).

14 Claims, 2 Drawing Sheets

BACK-LIGHT UNIT

TECHNICAL FIELD

The present invention relates to a back-light unit, more specifically, to a back-light unit that is able to improve structural stability and mass-production efficiency.

BACKGROUND ART

Generally, a liquid crystal display (LCD) is display device that is able to display desired images by transmitting a data signal to each of pixels arranged in a matrix type according to image information and adjusting light the transmissivity of the pixels. Such the LCD may not be self-light emitting and a back-light unit is installed to a backside of the LCD to present the image.

A plurality of supporting parts may be provided in the back-light unit to support an optical sheet and to keep surface flatness of the optical sheet such that air cavity of the back-light unit may maintain a predetermined height to maintain light uniformity.

DISCLOSURE OF INVENTION

Technical Problem

As a result, if the size of the back-light unit is relatively large and the number of the supporting parts is relatively small, the surface flatness of the optical sheet cannot be secured and bending would occur. Because of that, the height of the air cavity would be changed enough to deteriorate the light uniformity.

If the air cavity of the back-light is high, small even bending of the optical sheet would have a great influence on light uniformity.

Technical Solution

To solve the problems, an object of the present invention is to provide a back-light unit including supporting parts to which surface-mount technology (SMT) is applicable.

To achieve these objects and other advantages and in accordance with the purpose of the invention, as embodied and broadly described herein, a back-light unit includes a circuit substrate comprising a plurality of light sources arranged thereon; an optical sheet positioned on the circuit substrate; a plurality of supporting parts arranged between the circuit substrate and the optical sheet to support the optical sheet, the plurality of the supporting parts installed to the circuit substrate by using surface-mount technology (SMT).

In another aspect of the present invention, a back-light unit includes a circuit substrate comprising a plurality of light sources arranged thereon; an optical sheet positioned on the circuit substrate; a plurality of supporting parts arranged between the circuit substrate and the optical sheet to support the optical sheet, each of the plurality of the supporting parts fixedly installed on the circuit substrate by a solder and each of the plurality of the supporting parts comprising an outer surface coated with silicone resin.

Advantageous Effects

The present invention has following advantageous effects.
The plurality of the supporting parts provided in the back-light unit may be installable through an automation process. As a result, work efficiency may be improved effectively. In addition, desired air cavity may be secured advantageously without any abrasion of the optical sheet, even if the supporting parts are in contact with the optical sheet.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings:

FIG. 1 is a sectional view illustrating the back-light unit; and

FIG. 2 is a side sectional view illustrating a supporting part provided in the back-light unit.

FIG. 3 is a sectional view schematically illustrating the back-light unit;

FIG. 4 is a sectional view illustrating an embodiment of a supporting part provided in the back-light unit;

FIG. 5 is a sectional view illustrating another embodiment of the supporting part; and FIG. 6 is a sectional view illustrating the supporting part installed in the back-light unit.

BEST MODE

Reference will now be made in detail to the specific embodiments of the present invention, examples of which are illustrated in the accompanying drawings. Wherever possible, the same reference numbers will be used throughout the drawings to refer to the same or like parts.

When it is mentioned that an element such as a layer, region or substrate is provided 'on' another element, it may mean that the former element is provided on the latter element or another intermediate element is provided between the two elements.

Exemplary Embodiment

Figure 1:
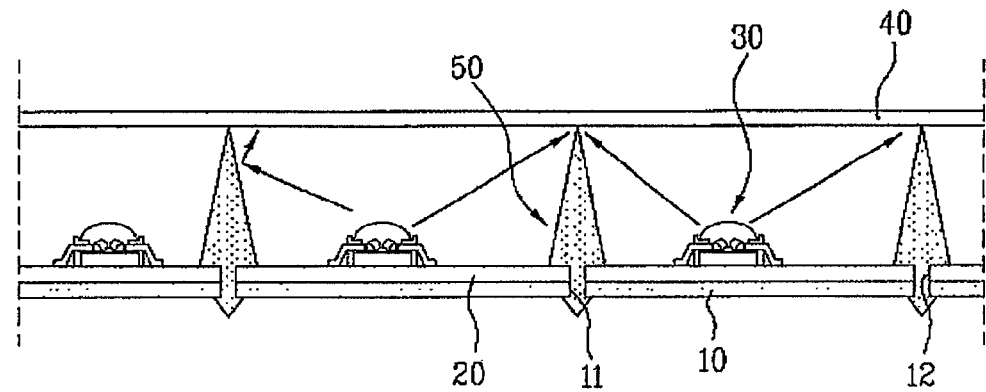
FIGS. 1 and 2 are diagrams illustrating a back-light unit according to an exemplary embodiment of the present invention.

As shown in FIG. 1, a back-light unit according to an exemplary embodiment of the present invention includes a rear chassis 10, a circuit substrate 20 having at least one light source 30 arranged thereon and an optical sheet 40 provided on the circuit substrate 20.

The light source 30 may be a light-emitting device package or Cold Cathode Fluorescent Lamp (CCFL) and the light sources are spaced apart a predetermined distance on the circuit substrate 20, respectively, to form uniform lights on the circuit substrate 20.

The optical sheet 40 is positioned on such the light sources 30 to diffuse lights of the light sources 30 uniformly. Such the optical sheet 40 may be configured of at least one of a diffuser plate, diffuser sheet, prism sheet and compound prism sheet.

Here, a plurality of supporting parts 50 may be arranged between the circuit substrate 20 and the optical sheet 40 uniformly. Such the supporting parts 50 support the optical sheet 40 provided on the back-light unit and they maintain surface-flatness of the optical sheet 40.

As a result, the supporting parts 50 maintain space of air cavity on the back-light unit to a predetermined height such that uniformity of the light of the back-light unit may be maintained.

Figure 2:
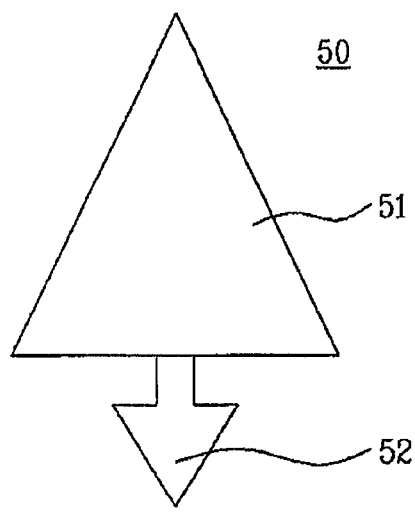

As shown in FIG. 2, the supporting part 50 includes a supporting body 51 that is a conical-shaped and a hook 52 for insertedly hooking the supporting body 51 to a hole formed on the circuit substrate 20 and a hole 11 formed on the rear chassis 10.

As mentioned above, the hook 52 is inserted in the holes 11 and 12 formed on the circuit substrate 20 and the chassis 20, respectively, such that the supporting part 50 is fixed. Such the installation work of the supporting parts 50 is performed manually.

In case the size of the back-light unit is relatively large, a sufficient number of the supporting parts 50 may be required. If the number of the supporting parts 50 is smaller than required, the optical sheet 40 would be not supported flatly and there would be the bending of the optical sheet 40. Because of that, the height of the air cavity of the back-light unit would change only to influence the uniformity of the light of the back-light unit negatively.

If the air cavity of the back-light unit is high, the small bending of the optical sheet 40 would not have influence on the uniformity of the light. However, if the air cavity is low, even the small bending of the optical sheet would have great influence on the uniformity of the light.

As a result, if the air cavity is low, the surface-flatness of the optical sheet 40 should be maintained as much as possible to maintain the uniformity of the light. For that, the number of the supporting parts 50 has to be large.

In addition, generally, the support parts 50 and the optical sheet 40 are not in contact and there is a gap, approximately, 0.5 mm between them. If an end of the supporting part 50 is in contact with the optical sheet 50, abrasion would occur in the optical sheet 50 because of scratches generated when moving the back-light unit and this might result in damage to the optical sheet 40.

Another Embodiment

Figure 3:
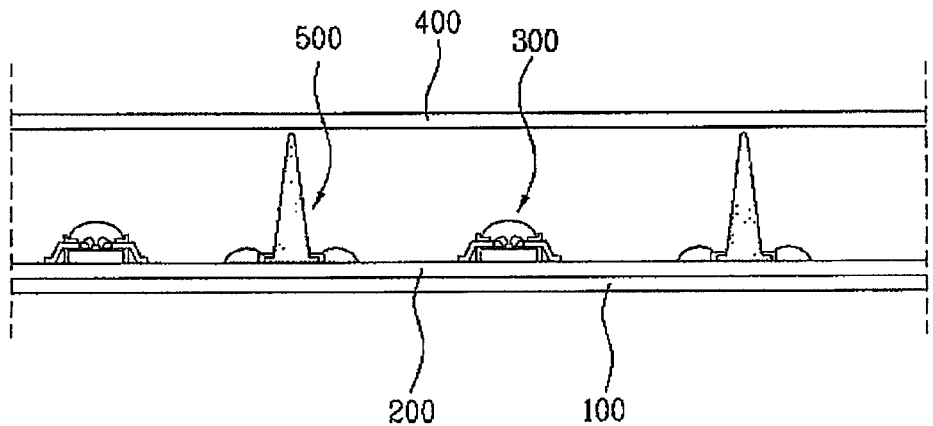
FIGS. 3 to 6 are diagrams illustrating a back-light unit according to another embodiment of the present invention.

As shown in FIG. 3, a back-light unit according to another embodiment of the present invention includes a rear chassis 100, a circuit substrate 200 having at least one light source 300 arranged thereon and an optical sheet 400 provided on the circuit substrate 200.

Although FIG. 3 presents a light-emitting device package as the light source 300, the other kinds of light sources such as CCFL may be used. Such light sources 300 are arranged on the circuit substrate 200, spaced apart a predetermined distance, to form uniform lights.

The optical sheet 400 is provided on the light sources 300 to diffuse lights of the light sources 300 uniformly. Such the optical sheet 400 may be configured of at least one of a diffuser plate, diffuser sheet, prism sheet and compound prism sheet.

Here, a plurality of supporting parts 500 may be arranged between the circuit substrate 200 and the optical sheet 400 uniformly. Such supporting parts 500 support the optical sheet 400 provided on the back-light unit and it maintains surface-flatness of the optical sheet 400.

As a result, the supporting parts 500 maintain space of air cavity on the back-light unit to a predetermined height such that uniformity of the light of the back-light unit may be maintained.

Such the supporting parts 500 may be installed on the circuit substrate 200 by using surface mount technology (SMT). That is, a SMT device attaches each of the supporting parts 500 to the circuit substrate 200 by using solder such as lead.

In case the supporting parts 500 are surface-mounted to the circuit substrate 200, the supporting parts 500 may be installable in an automation process by using the SMT device such that work efficiency and mass-productivity may be improved and that the number of the supporting parts 500 may not be influent largely.

That is, even if the large number of the supporting parts 500 is applied to a thin back-light unit or a back-light unit having the surface-flatness of the optical sheet 400 as important element, the automated process may be applied to the installation of the supporting parts 500 and thus the manufacturing work can be performed smoothly.

An embodiment of the supporting part 500 installable by such the surface mount technology (SMT) may be configured of a supporting body 510 and a lead frame 20520 positioned under the supporting body 510.

This supporting body 510 has a conical or pyramid shape having a larger cross section upward from a bottom thereof. A base 511 is further provided and the width of the base is larger than the width of the supporting body 510, such that the lead frame 520 may be positioned on the base 511. Alternatively, the supporting body 510 may be columnar-shaped.

Such the lead frame 520 enables the supporting part 500 to be fixedly installed on the circuit substrate 200 by the solder.

The supporting body 510 may be formed of at least one of polycarbonate (PP), Polyphthalamide (PPA), silicone resin and epoxy.

Figure 5:
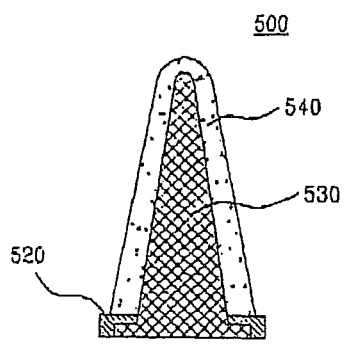

As shown in FIG. 5, a thin layer 540 may be provided on the supporting body 530 and the thin layer 540 may be formed of material that is more flexible than the material of the supporting body 530, for example, silicone resin or epoxy resin.

Figure 4:
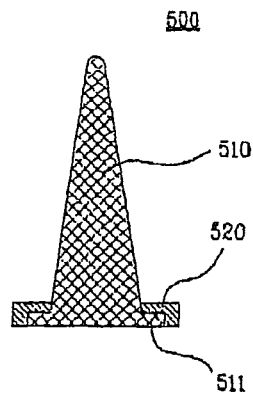

As shown in FIG. 4, the supporting body 530 may be formed of at least one of polycarbonate (PP), Polyphthalamide (PPA), silicone resin and epoxy. The thin layer 540 formed of flexible material such as silicone resin is provided on the supporting body 530 to prevent damage of the optical sheet that might occur because of scratches.

That is, if the supporting body 530 itself is formed of flexible material such as silicone resin, the supporting part 500 may be bending. Because of that, the supporting part 530 is formed of hard material and the thin layer 540 formed of flexible material is formed on the supporting body 530.

As a result, the supporting parts 500 having the above configuration may be installable in contact with the optical sheet 400 directly, without the predetermined distance with the optical sheet 400. Although the supporting parts 500 are in contact with the optical sheet 400 directly, there would be no damage to the optical sheet 400.

An example of the SMT that is used in the installation of the above supporting parts 500 will be described.

First of all, liquefied solder cream is coated on an area of the circuit substrate 200 where the supporting parts 500 will be installed. Here, an auxiliary dummy circuit line or pattern 201 may be positioned on the area of the circuit substrate 200 where the supporting parts 500 will be installed.

Hence, the lead frame 520 of the supporting part 500 is mounted to be positioned on the solder-cream-coated area of the circuit substrate 200.

The solder cream is hardened by using methods of applying heat or beams to fix the supporting part 500 to the circuit substrate 200.

The supporting parts 500 may be fixedly installed to the circuit substrate 200 in the automation process by using this surface-mount technology (SMT). Such the installation process of the supporting parts 500 and the installation process of the light-emitting device package may be performed simultaneously.

Figure 6:
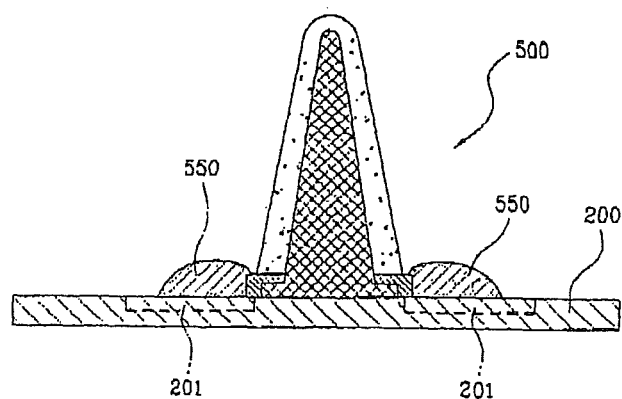

FIG. 6 illustrates the supporting part 500 fixedly installed to the circuit substrate 200 by the solder 550 through the above process.

As shown in FIG. 6, the supporting parts 500 may be installable stably by the solder 550 in the automation process such that there is little limit of the number of such the supporting parts 500 and that the optical sheet 400 of the back-light unit may be supported stably by the supporting parts 500 enough to secure the air cavity stably. As a result, the back-light having the uniformity of the light maximized as possible may be provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention has an industrial applicability.

The surface-mount technology (SMT) is applicable to the supporting parts according to the present invention. As a result, the supporting parts are, installable in the automated process and work efficiency as well as productivity may be improved. Although the number of the supporting parts is substantially large in case of a back-light unit having surface-flatness of the optical sheet as important element such as thin back-light unit, the supporting parts may be installed through the automated process and manufactured efficiently.

Furthermore, the optical sheet is in contact with the supporting parts directly by applying the flexible material such as silicone resin to the supporting parts, without distance between them. As a result, the air cavity may be maintained uniformly and stably.

The invention claimed is:

1. A back-light unit comprising:
a circuit substrate comprising a plurality of light sources arranged thereon;
an optical sheet positioned on the circuit substrate;
a plurality of supporting parts arranged between the circuit substrate and the optical sheet to support the optical sheet, the plurality of the supporting parts installed to the circuit substrate by using surface-mount technology (SMT), wherein the plurality of the supporting parts include a supporting body and a lead frame positioned under the supporting body.

2. The back-light unit as claims in claim 1, wherein lead frame includes metal material.

3. The back-light unit as claimed in claim 1, wherein the lead frame positioned under the supporting body is provided on a base.

4. The back-light unit as claimed in claim 3, wherein the width of the base is substantially wider than the supporting body.

5. The back-light unit as claimed in claim 1, wherein the supporting body includes at least one of polycarbonate (PP), Polyphtalamide (PPA), silicon resin and epoxy.

6. The back-light unit as claimed in claim 1, wherein a thin layer includes predetermined material that is more flexible than material of the supporting body is provide on a surface of the supporting body.

7. The back-light unit as claimed in claim 6, wherein the thin layer includes silicone resin or epoxy resin.

8. The back-light unit as claimed in claim 1, wherein the supporting part has a cross section that is narrower upward.

9. The back-light unit as claims in claim 1, wherein an upper end of the supporting part is in contact with the optical sheet.

10. The back-light unit as claimed in claim 1, wherein the optical sheet comprises at least one of a diffuser plate, diffuser sheet, prism sheet and compound prism sheet.

11. The back-light unit as claimed in claim 1, wherein the light source includes a light-emitting device package or cold cathode fluorescent Lamp (CCFL).

12. The back-light unit as claimed in claim 1, wherein the supporting part is fixed to a dummy pattern arranged on the circuit substrate by a solder.

13. A back-light unit comprising:
a circuit substrate comprising a plurality of light sources arranged thereon;
an optical sheet positioned on the circuit substrate;
a plurality of supporting parts arranged between the circuit substrate and the optical sheet to support the optical sheet, wherein the plurality of the supporting parts are fixedly installed on the circuit substrate by a solder, wherein the plurality of the supporting parts includes an outer surface coated with silicone resin, and wherein the plurality of the supporting parts includes a lead frame to fix the supporting parts by the solder.

14. The back-light unit as claimed in claim 13, wherein each of the supporting parts is installed by using surface-mount technology (SMT).

* * * * *